US011267938B2

(12) United States Patent
Louis et al.

(10) Patent No.: US 11,267,938 B2
(45) Date of Patent: Mar. 8, 2022

(54) METHOD OF MAKING A SHAPED ARTICLE COMPRISING PRINTING LAYERS OF A POLYMER COMPOSITION COMPRISING AT LEAST ONE PEEK-PEMEK COPOLYMER

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US)

(73) Assignee: SOLVAY SPECIALTY POLYMERS USA, INC, Alphareta, GA (US)

( * ) Notice: Subject to any disclaimer, the term of this patent is extended or adjusted under 35 U.S.C. 154(b) by 36 days.

(21) Appl. No.: 16/771,697

(22) PCT Filed: Dec. 20, 2018

(86) PCT No.: PCT/EP2018/086225
§ 371 (c)(1),
(2) Date: Jun. 11, 2020

(87) PCT Pub. No.: WO2019/122143
PCT Pub. Date: Jun. 27, 2019

(65) Prior Publication Data
US 2021/0070933 A1    Mar. 11, 2021

Related U.S. Application Data

(60) Provisional application No. 62/608,245, filed on Dec. 20, 2017.

(30) Foreign Application Priority Data

Feb. 21, 2018    (EP) .................................... 18157845

(51) Int. Cl.
*C08G 65/40*    (2006.01)
*B33Y 70/00*    (2020.01)
(Continued)

(52) U.S. Cl.
CPC ........ *C08G 65/4093* (2013.01); *B29C 64/118* (2017.08); *B33Y 70/00* (2014.12);
(Continued)

(58) Field of Classification Search
CPC ...................... C08G 65/4093; C08G 65/4012; B33Y 70/00; B33Y 70/10; B29C 64/118;
(Continued)

(56) References Cited

U.S. PATENT DOCUMENTS 9,133,111 B2    9/2015 Louis et al.

FOREIGN PATENT DOCUMENTS

GB    2542704 A    3/2017
JP    1198624 A    8/1989
(Continued)

OTHER PUBLICATIONS

ASTM D3418-03—Standard Test Method for Transition Temperatures of Polymers by Differential Scanning Calorimetry, 2003, 7 pages.
(Continued)

*Primary Examiner* — Stella K Yi

(57) ABSTRACT

A method of making a shaped article comprising printing layers of a polymer composition comprising at least one PEEK-PEmEK copolymer having $R_{PEEK}$ and $R_{PEmEK}$ repeat units in a molar ratio $R_{PEEK}/R_{PEmEK}$ ranging from 95/5 to 45/55, the polymer composition optionally including at least one reinforcing filler, at least one additive, or a combination thereof, and shaped articles obtained from the method. Also described are methods of making the PEEK-PEmEK copolymer and methods of making the polymer composition.

20 Claims, 1 Drawing Sheet

(51) Int. Cl.

| | | |
|---|---|---|
| *B29C 64/118* | (2017.01) | |
| *C08K 3/26* | (2006.01) | |
| *C08F 292/00* | (2006.01) | |
| *C08K 3/04* | (2006.01) | |
| *C08K 7/06* | (2006.01) | |
| *C08K 7/14* | (2006.01) | |
| *C09D 161/00* | (2006.01) | |
| *B33Y 70/10* | (2020.01) | |
| *C08K 7/02* | (2006.01) | |
| *C09D 161/16* | (2006.01) | |
| *B33Y 10/00* | (2015.01) | |
| *B29K 71/00* | (2006.01) | |
| *B29K 309/08* | (2006.01) | |

(52) U.S. Cl.
CPC ............ *B33Y 70/10* (2020.01); *C08F 292/00* (2013.01); *C08G 65/4012* (2013.01); *C08K 3/04* (2013.01); *C08K 3/26* (2013.01); *C08K 7/02* (2013.01); *C08K 7/06* (2013.01); *C08K 7/14* (2013.01); *C09D 161/00* (2013.01); *C09D 161/16* (2013.01); *B29K 2071/00* (2013.01); *B29K 2309/08* (2013.01); *B33Y 10/00* (2014.12); *C08K 2003/262* (2013.01)

(58) Field of Classification Search
CPC ........... C08F 292/00; C08K 3/04; C08K 7/02; C08K 7/06; C08K 7/14; C09D 161/00; C09D 161/16

See application file for complete search history.

(56) References Cited

FOREIGN PATENT DOCUMENTS

| | | |
|---|---|---|
| JP | 2004307629 A | 11/2004 |
| WO | 2016092087 A1 | 6/2016 |
| WO | 2017153290 A1 | 9/2017 |

OTHER PUBLICATIONS

ASTM E794-06—Standard Test Method for Melting and Crystallization Temperatures by Thermal Analysis, 2006, 4 pages.

Murphy J., in "Additives for Plastics Handbook", 2nd Edition, 2001, Chapter 5.2.3., p. 43-48 —Elsevier Advanced Technology.

Rama Rao M. et al., "Synthesis, characterization and thermal degradation studies of poly(ether ether ketone) copolymers", POLYMER., vol. 33 No. 13, 1992, pp. 2834-2839, Butterworth-Heinemann Ltd.

Lee C.-J. et al., "Structure and Properties of Poly(arylene etherketone)s containing Resorcinol units", Journal of the Korean Fiber Society, 1993, pp. 50-64.

ASTM E793-06—Standard Test Method for Enthalpies of fusion and Crystallization by Differentail Scanning Calorimetry, 2006, 4 pages.

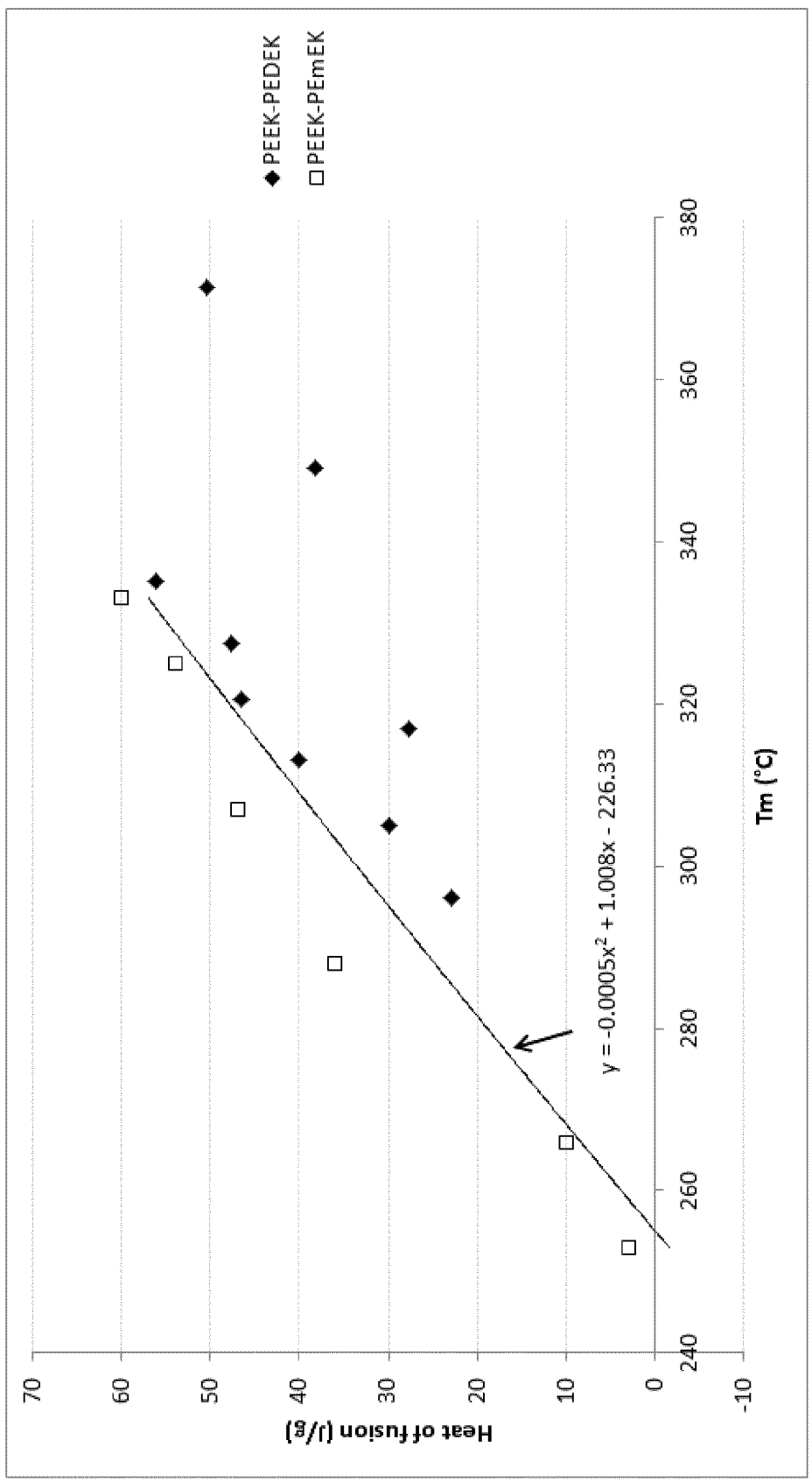

METHOD OF MAKING A SHAPED ARTICLE COMPRISING PRINTING LAYERS OF A POLYMER COMPOSITION COMPRISING AT LEAST ONE PEEK-PEMEK COPOLYMER

CROSS-REFERENCE TO RELATED APPLICATIONS

This application is a U.S. national stage entry under 35 U.S.C. § 371 of International Application No. PCT/EP2018/086225 filed Dec. 20, 2018, which claims priority to U.S. provisional application 62/608,245 filed on Dec. 20, 2017 and to European application 18157845.1 filed on Feb. 21, 2018, the whole content of each of these applications being incorporated herein by reference for all purposes.

FIELD OF THE INVENTION

The present invention relates to a method of making a shaped article (or object or part) comprising at least one step consisting in printing layers of a polymer composition comprising at least one PEEK-PEmEK copolymers. The present invention also relates to a part material, for 3D printing, including the polymer composition comprising at least one PEEK-PEmEK copolymers, The part material is for example in the form of a filament or a powder. The present invention also relates to shaped articles obtained through this method.

BACKGROUND

Poly(aryl ether ketone) polymers (PAEK), such as poly(ether ether ketone) polymers (PEEK), are known for their high temperature performance and excellent chemical resistance; however, because of their melting temperatures (Tm) which are generally too high, their processing temperatures require costlier, energy-intensive processing. Their high melting temperatures (Tm) can also result in polymers being unstable during processing, especially when the polymers must be kept at a temperature above or just below their melting temperature for extended periods of time. Examples of such applications include additive manufacturing (AM), also called 3D printing, powder coatings and continuous fiber thermoplastic composites.

Accordingly, a need exists for new PAEK polymers that can be reliably processed at lower temperatures, and which retain their technical properties, notably their chemical resistance and mechanical properties (when compared with conventional PAEK polymers).

BRIEF DESCRIPTION OF THE FIGURES

FIG. 1 is a plot based on the data in Table 1 comparing the heats of fusion of PEEK-PEDEK and PEEK-PEmEK copolymers at various melting temperatures (Tm).

DETAILED DESCRIPTION OF PREFERRED EMBODIMENTS

The present invention relates to a method of making a shaped article comprising printing layers of a polymer composition comprising at least one PEEK-PEmEK copolymer having $R_{PEEK}$ and $R_{PEmEK}$ repeat units in a molar ratio $R_{PEEK}/R_{PEmEK}$ ranging from 95/5 to 45/55, the polymer composition optionnally including at least one reinforcing filler, at least one additive, or a combination thereof. Also described are methods of making the polymer composition, and shaped articles including the polymer composition.

The PEEK-PEmEK copolymers described in the present invention having a molar ratio $R_{PEEK}/R_{PEmEK}$ ranging from 95/5 to 45/55 advantageously exhibit a relationship between melting temperature (Tm) and heat of fusion ($\Delta H$) satisfying the inequality:

$$\Delta H \geq -0.0005(Tm)^2 + 1.008(Tm) - 226.33$$

where:

$\Delta H$ is the heat of fusion in J/g determined as the area under the melting endotherm on the second heat scan in a differential scanning calorimeter (DSC) according to ASTM D3418-03 and E793-06, using heating and cooling rates of 20° C./min, and Tm is the melting temperature of the PEEK-PEmEK copolymer in ° C. measured as the peak temperature of the melting endotherm on the second heat scan in a differential scanning calorimeter (DSC) according to ASTM D3418-03 and E794-06 and using heating and cooling rates of 20° C./min.

PEEK-PEmEK copolymers meeting this inequality may have, for example, a higher crystallinity (and associated chemical resistance) at a given melting temperature (Tm), as compared with other low melting temperature (Tm) PAEKs known in the art, such as PEEK-PEDEK copolymers.

PEEK-PEmEK Copolymer

As used herein, a "PEEK-PEmEK copolymer" comprises at least 50 mol. %, collectively, of repeat units ($R_{PEEK}$) and repeat units ($R_{PEmEK}$), relative to the total number of moles of repeat units in the PEEK-PEmEK copolymer. In some embodiments, the PEEK-PEmEK copolymer comprises at least 60 mol. %, at least 70 mol. %, at least 80 mol. %, at least 90 mol. %, at least 95 mol. %, and most preferably at least 99 mol. % of repeat units ($R_{PEEK}$) and ($R_{PEmEK}$), relative to the total number of moles of repeat units in the PEEK-PEmEK copolymer.

Repeat unit ($R_{PEEK}$) is represented by formula:

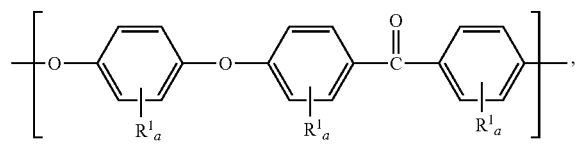

(A)

and repeat unit ($R_{PEmEK}$) is represented by formula:

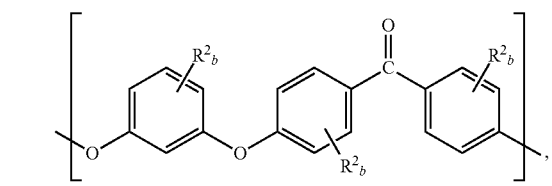

(B)

where each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each a and b is independently selected from the group consisting of integers ranging from 0 to 4.

In some embodiments, each a is zero, such that the repeat units ($R_{PEEK}$) are repeat units of formula:

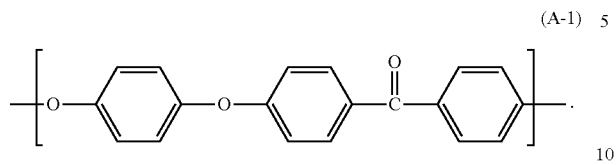
(A-1)

In some embodiments, each b is zero, such that the repeat units ($R_{PEmEK}$) are repeat units of formula:

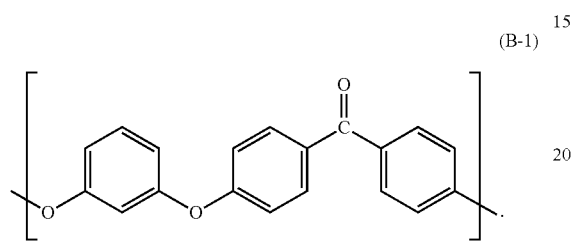
(B-1)

Preferably, repeat units ($R_{PEEK}$) are repeat units of formula (A-1), and repeat units ($R_{PEmEK}$) are repeat units of formula (B-1).

The PEEK-PEmEK copolymer of the present invention may additionally comprise repeat units ($R_{PAEK}$) different from repeat units ($R_{PEEK}$) and ($R_{PEmEK}$), as above detailed. In such case, the amount of repeat units ($R_{PAEK}$) can be comprised between 0.1 and 5 mol. %, with respect to the total number of moles of repeat units of PEEK-PEmEK copolymer.

When repeat units ($R_{PAEK}$) different from repeat units ($R_{PEEK}$) and ($R_{PEmEK}$) are present in the PEEK-PEmEK copolymer of the present invention, these repeat units ($R_{PAEK}$) generally comply with any of the following formulae (K-A) to (K-M) herein below:

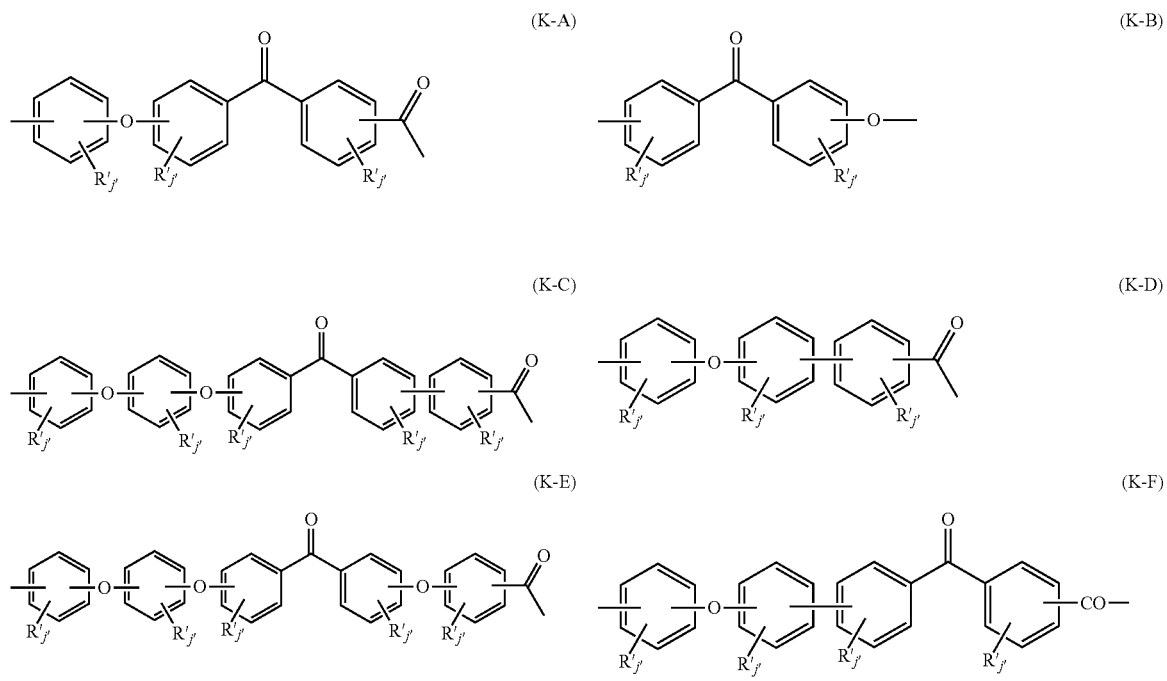

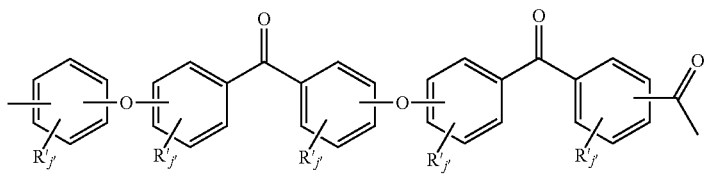
(K-G)

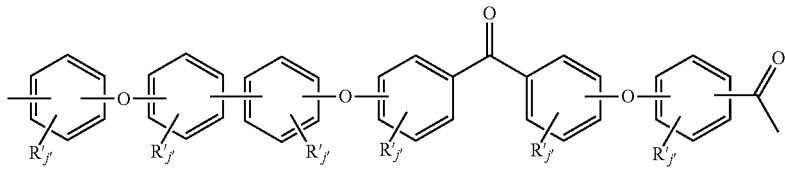
(K-H)

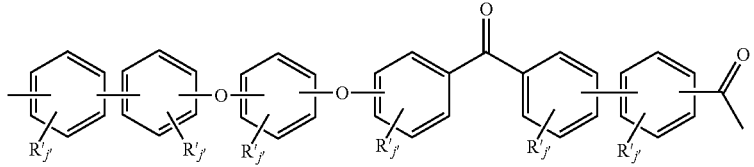
(K-I)

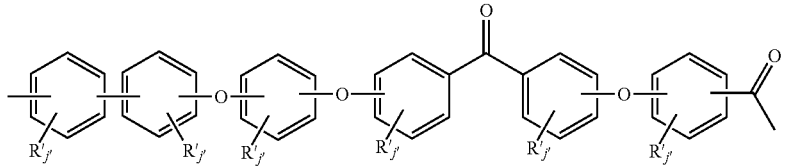
(K-J)

(K-K)

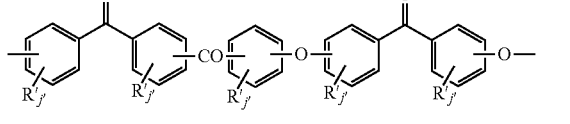
(K-L)

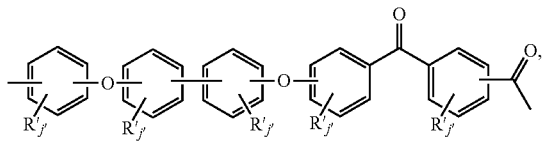
(K-M)

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the PEEK-PEmEK copolymer of the present invention to be essentially composed of repeat units ($R_{PEEK}$) and ($R_{PEmEK}$), as above detailed. Thus, in some embodiments, the PEEK-PEmEK copolymer consists essentially of repeat units $R_{PEEK}$ and $R_{PEmEK}$. As used herein, the expression "consists essentially of repeat units $R_{PEEK}$ and $R_{PEmEK}$" means that any additional repeat unit different from repeat units $R_{PEEK}$ and $R_{PEmEK}$, as above detailed, may be present in the PEEK-PEmEK copolymer in amount of at most 1 mol. %, at most 0.5 mol. % or at most 0.25 mol. %, relative to the total number of moles of repeat units in the PEEK-PEmEK copolymer, and so as not to substantially alter the advantageous properties of the PEEK-PEmEK copolymer.

Repeat units $R_{PEEK}$ and $R_{PEmEK}$ are present in the PEEK-PEmEK copolymer in a $R_{PEEK}/R_{PEmEK}$ molar ratio ranging from 95/5 to 45/55, preferably from 95/5 to 50/50, from 90/10 to 50/50, from 85/15 to 58/42.

In some embodiments, the PEEK-PEmEK copolymer has a melting temperature (Tm) of less than or equal to 335° C., preferably less than or equal to 325° C. The melting temperatures described herein are measured as the peak temperature of the melting endotherm on the second heat scan in a differential scanning calorimeter (DSC) according to ASTM D3418-03 and E794-06, and using heating and cooling rates of 20° C./min.

In some embodiments, the PEEK-PEmEK copolymer has as heat of fusion (ΔH) of at least 1 J/g, preferably at least 5 J/g, at least 10 J/g, at least 15 J/g, or at least 25 J/g. The heats of fusion described herein are determined as the area under the melting endotherm on the second heat scan in a differential scanning calorimeter (DSC) according to ASTM D3418-03 and E793-06, with heating and cooling rates of 20° C./min. In some aspects, the PEEK-PEmEK copolymer has as heat of fusion (ΔH) of at most 65 J/g, preferably at most 60 J/g.

In some embodiments, the PEEK-PEmEK copolymer exhibits a tensile modulus of at least 550 ksi, preferably at least 600 ksi as measured according to ASTM D638 at room temperature.

In some embodiments, the PEEK-PEmEK copolymer has a glass transition temperature (Tg) of less than or equal to 155° C., preferably less than or equal to 145° C., less than or equal to 140° C., or less than or equal to 135° C. as measured in a differential scanning calorimeter (DSC) according to ASTM D3418-03 and E1356-03.

In some embodiments, the PEEK-PEmEK copolymer has a melt viscosity (MV) as measured according to ASTM D3835 at 410° C., 46.3 s$^{-1}$ ranging from 0.10 to 5.0 kN/m$^2$, preferably ranging from 0.15 to 3.0 kN/m$^2$.

Method of Making the PEEK-PEmEK Copolymer

The method of making the PEEK-PEmEK copolymer described above, comprises reacting at least one difluoro-compound of formula (C):

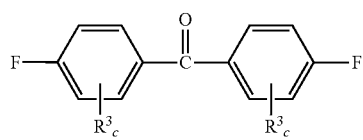

(C)

with a mixture of di-hydroxy compounds of formulas (D) and (E):

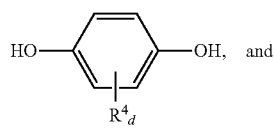

(D)

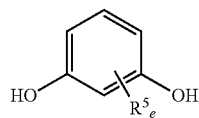

(E)

in a molar ratio (D)/(E) ranging from 95/5 to 45/55, wherein each $R^3$, $R^4$, and $R^5$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and each c, d, and e is independently selected from the group consisting of integers ranging from 0 to 4, in a polar organic solvent in the presence of a base, such as, for example, $Na_2CO_3$, $K_2CO_3$, or a combination thereof. Preferably each of c, d, and e is zero.

Preferably, the compound of formula (C) is 4,4'-difluorobenzophenone (DFBP). Preferably, the compound of formula (D) is hydroquinone. Preferably, the compound of formula (E) is resorcinol. In some embodiments, the compound of formula (C) is 4,4'-difluorobenzophenone (DFBP), the compound of formula (D) is hydroquinone, and the compound of formula (E) is resorcinol.

Polar organic solvents possessing suitable solubilisation ability with respect to the cited monomers, and suitable thermal resistance at the polycondensation temperatures can be used. Preference is given to high boiling aprotic polar solvents; diphenysulfone is a preferred solvent, and is generally used in the method of the present invention as solvent comprising limited amounts of impurities, as detailed in U.S. Pat. No. 9,133,111 to Solvay Advanced Polymers, LLC.

It is also preferable that the compounds (C), (D) and (E) are heated in the method of the invention at a first temperature of at least 130° C., preferably at least 140° C., more preferably at least 150° C. before being contacted with the base, preferably $Na_2CO_3$ and/or $K_2CO_3$. The reaction mixture is then heated at a temperature of at least 260° C., preferably at least 280° C., at a temperature ramp rate of less than 5° C./minute, preferably less than 3° C./minute and/or at a temperature ramp rate of more than 0.1° C./minute. As described in the Examples, once the final target temperature is attained, the reaction is generally continued for a limited time at this temperature, before being terminated.

The Polymer Composition

The PEEK-PEmEK copolymer can be desirably incorporated into polymer compositions. The polymer composition includes the PEEK-PEmEK copolymer and at least one of a reinforcing filler, as described below, or at least one additive, different from the reinforcing filler as described below, or a combination thereof. The polymer composition comprises at least 10 wt. %, at least 20 wt. %, at least 30 wt. % of the polymer composition, based on the total weight of the polymer composition. In some embodiments, the polymer composition comprises PEEK-PEmEK copolymer represents at least 50 wt. %, preferably at least 60 wt. %, at least 70 wt. %, at least 80 wt. %, at least 90 wt. %, at least 95 wt. %, at least 99 wt. % of the PEEK-PEmEK copolymer, based on the total weight of the polymer composition. In some embodiments, the polymer composition comprises less than 50 wt. %, preferably less than 45 wt. %, more preferably less than 40 wt. % of the PEEK-PEmEK copolymer, based on the total weight of the polymer composition.

Reinforcing Fillers

In some embodiments, the polymer composition includes at least one reinforcing filler. Reinforcing fillers are well known to those of skill in the art. They are preferably selected from fibrous and particulate fillers different from the pigments as described below. More preferably, the reinforcing filler is selected from mineral fillers (such as talc, mica, kaolin, calcium carbonate, calcium silicate, magnesium carbonate, boron nitride), glass fiber, carbon fibers, synthetic polymeric fiber, aramid fiber, aluminum fiber, titanium fiber, magnesium fiber, boron carbide fibers, boron nitride fibers, rock wool fiber, steel fiber, wollastonite, etc. Nano-scale reinforcing fillers can also be used. These fillers include: single and multi-wall carbon nanotubes, carbon nanofibers, graphene, graphene oxide, and nanoclays such as montmorillonite. Still more preferably, it is selected from mica, kaolin, calcium silicate, magnesium carbonate, glass fiber, carbon fibers and wollastonite.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, 2$^{nd}$ edition, John Murphy.

Glass fibers optionally comprised in polymer composition may have a circular cross-section or a non-circular cross-section (such as an oval or rectangular cross-section).

When the glass fibers used have a circular cross-section, they preferably have an average glass fiber diameter of 3 to 30 μm and particularly preferred of 5 to 12 μm. Different sorts of glass fibers with a circular cross-section are available on the market depending on the type of the glass they are made of. One may notably cite glass fibers made from E- or S-glass.

In some embodiments, the glass fiber is standard E-glass material with a non-circular cross section. In some aspects, the polymer composition includes S-glass fibers with a round cross-section.

In some embodiments, the polymer composition includes at least one carbon fiber. As used herein, the term "carbon fiber" is intended to include graphitized, partially graphitized, and ungraphitized carbon reinforcing fibers or a mixture thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

In some embodiments, the polymer composition comprises less than 60 wt. %, more preferably less than 50 wt. %, even more preferably less than 45 wt. %, most preferably less than 35 wt. % of reinforcing filler, based on the total weight of the polymer composition.

In some embodiments, the polymer composition comprises at least 10 wt. %, preferably at least 20 wt. %, preferably at least 25%, most preferably at least 30 wt. % of reinforcing filler, based on the total weight of the polymer composition.

Additives

In some embodiments, the polymer composition comprises at least one additive different from the reinforcing filler and from the PEEK-PEmEK copolymer, as above detailed, generally selected from the group consisting of (i) colorants such as a dye (ii) pigments such as titanium dioxide, zinc sulfide and zinc oxide (iii) light stabilizers, e.g. UV stabilizers, (iv) heat stabilizers, (v) antioxidants such as organic phosphites and phosphonites, (vi) acid scavengers, (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives such as carbon black and carbon nanofibrils, (xiii) plasticizers, (xiv) flow modifiers (xv), extenders, (xvi) metal deactivators and (xvii) flow aid such as silica.

In some embodiments, the polymer composition includes less than 20 wt. % of additives, preferably less than 10 wt. %, more preferably less than 5 wt. % and even more preferably less than 2 wt. % of additives, most preferably less than 1 wt. %.

In some embodiments, the polymer composition comprises as an additive 40 wt. % or less of at least one poly(aryl ether sulfone) (PAES) selected from the group consisting of a polysulfone (PSU), a polyphenylsulfone (PPSU), and a poly(ether sulfone) (PES), based on total weight of the polymer composition.

In some embodiments, the polymer composition comprises as an additive 40 wt. % or less of at least one poly(aryl ether ketone) (PAEK) polymers, for example a poly(ether ether ketone) (PEEK) polymer.

In alternative embodiments, the PEEK-PEmEK copolymer, as above detailed, is the only polymeric component in the polymer composition. As used herein, the expression "polymeric component" means a compound having repeat units and a molecular weight of at least 2,000 g/mol. In some embodiments, the polymer composition includes less than 3 wt. %, 2 wt. %, 1 wt. %, 0.5 wt. % of a polymeric component other than the PEEK-PEmEK copolymer.

Methods of Making the Polymer Composition

The polymer composition can be prepared by a variety of methods involving intimate admixing of the components of the polymer composition, for example by dry blending, suspension or slurry mixing, solution mixing, melt mixing or a combination of dry blending and melt mixing. As used herein, the "components of the polymer composition" includes the PEEK-PEmEK copolymer, as above detailed, and at least one of the at least one reinforcing filler, the at least one additive, and of a combination thereof.

Typically, the dry blending of the components of the polymer composition is carried out by using high intensity mixers, such as Henschel-type mixers, paddle mixers or ribbon mixers to obtain the polymer composition as a physical mixture.

Alternatively, the intimate admixing of the components of the polymer composition is carried out by tumble blending based on a single axis or multi-axis rotating mechanism to obtain a physical mixture.

Alternatively, the slurry mixing of the components of the polymer composition is carried out by slurrying the components of the polymer composition using an agitator in an appropriate liquid, such as, for example, methanol, followed by filtering the liquid away, to obtain a powder mixture of the components of the polymer composition.

The solution mixing of the components of the polymer composition can be carried out by mixing the components with an agitator in at least one solvent such as, for example, diphenyl sulfone, benzophenone, 4-chlorophenol, 2-chlorophenol, or meta-cresol.

In some embodiments, the method of making the polymer composition includes melt compounding the physical mixture. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture additional shaped articles.

Shaped Articles and Methods of Making

Exemplary embodiments also include shaped articles comprising the above-described polymer composition and methods of making the shaped articles.

The shaped article can include one or more parts. When the shaped article is a single part, the single part preferably consists of the polymer composition.

Alternatively, the shaped article may consist of more than one part, one or more of which preferably consists of the polymer composition. When more than one part of the shaped article includes the polymer composition, each part may include the same polymer composition or a different polymer composition as described herein.

The weight of the polymer composition, based on the total weight of shaped article, is preferably greater than 1 wt. %, greater than 5 wt. %, greater than 10 wt. %, preferably greater than 15 wt. %, greater than 20 wt. %, greater than 30 wt. %, greater than 40 wt. %, greater than 50 wt. %, greater than 60 wt. %, greater than 70 wt. %, greater than 80 wt. %, greater than 90 wt. %, greater than 95 wt. % and greater than 99 wt. %.

The polymer composition may be well suited for the manufacture of articles useful in a wide variety of applications. For example, the properties of the PEEK-PEmEK copolymer described herein makes the polymer composition especially suitable for use in automotive applications such as magnet wire coatings in hybrid and electric vehicles, oil and gas applications such as downhole cable coatings, structural components for mobile electronic devices (e.g., framework or housing), thermoplastic composites for structural and transportation applications, electrostatic powder coatings on metal substrates for corrosion protection and abrasion resistance, and parts produced by additive manufacturing for a wide range of applications.

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

The shaped article may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, shafts, shells, or pistons.

In particular, the polymer composition is very well suited for use as a coating for wires or cables, as a structural part of a mobile electronic devices, or as a part produced by additive manufacturing. Thus, exemplary embodiments also include shaped articles made, at least in part, by the additive manufacturing methods described below using the polymer composition described above. Such shaped articles can be used in a variety of final applications such as implantable medical devices, dental prostheses, and brackets and complex shaped parts in the aerospace and automotive industries.

Methods of Making the Shaped Articles

The shaped articles described herein are made from the polymer composition by additive manufacturing, also called three-dimensional (3D) printing. The shaped articles may also be called 3D objects or 3D parts.

In these methods of making shaped articles by additive manufacturing, the shaped article is printed from the polymer composition, also called "part material". The methods include printing layers of the shaped article from the polymer composition as described below. The expression "part material" hereby refers to a polymeric composition comprising at least the PEEK-PEmEK copolymer, and intended to form at least a part of the 3D object. The part material is according to the present invention used as feedstocks to be used for the manufacture of shaped articles, 3D objects or part of 3D objects.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

For example, in an extrusion-based additive manufacturing system, a shaped article may be printed from a digital representation of the shaped article in a layer-by-layer manner by extruding and adjoining strips of the polymer composition. The polymer composition is extruded through an extrusion tip carried by a print head of the system, and is deposited as a sequence of roads on a platen in an x-y plane. The extruded material fuses to previously deposited material and solidifies as it cools. The position of the print head relative to the substrate is then incremented along a z-axis (perpendicular to the x-y plane), and the process is repeated to form a shaped article resembling the digital representation. An example of an extrusion-based additive manufacturing system is Fused Filament Fabrication (FFF), also known as Fused Deposition Modelling (FDM). Pellet Additive Manufacturing (PAM) is an example of a 3D printing method capable of printing raw materials as pellets.

As another example, in a powder-based additive manufacturing system, a laser is used to locally sinter powder into a solid part. A shaped article is created by sequentially depositing a layer of powder followed by a laser pattern to sinter an image onto that layer. An example of a powder-based additive manufacturing system is Selective Laser Sintering (SLS).

As another example, carbon-fiber composite shaped articles can be prepared using a continuous Fiber-Reinforced Thermoplastic (FRTP) printing method. This method is based on fused-deposition modeling (FDM) and prints a combination of fibers and resin.

The advantageous properties of the polymer composition discussed above make the polymer composition particularly suitable for additive manufacturing applications.

Accordingly, some embodiments include a method of making a shaped article comprising printing layers of the polymer composition to form the shaped article by an extrusion-based additive manufacturing system (for example FFF or PAM), a powder-based additive manufacturing system (for example SLS), or a continuous Fiber-Reinforced Thermoplastic (FRTP) printing method.

The method of the present invention employs the copolymers as main elements of the part material, which can for example be shaped in the form of filaments or microparticles (with a regular shape such as spheres, or with a complex shape obtained by grinding/milling of pellets), to build a 3D object (e.g. a 3D model, a 3D article or a 3D part). The polymers may also be printed in the form of pellets.

Some embodiments include a filament including the polymer composition. Preferably, the filament is suitable for use in additive manufacturing methods as described above, such as FFF or FDM.

The term "filament" refers to a thread-like object or fiber including the polymer composition. The filament may have a cylindrical or substantially cylindrical geometry, or may have a non-cylindrical geometry, such as a ribbon-shaped filament. The filament may be hollow, or may have a core-shell geometry, with a different polymer composition comprising either the core or the shell.

When the filament has a cylindrical geometry, the diameter of the cross-section of the fiber preferably ranges from 0.5 to 5 mm, preferably from 0.8 to 4 mm, preferably from 1 mm to 3.5 mm. The diameter of the filament can be chosen to feed a specific FFF 3D printer. An example of filament diameter used in FFF processes is about 1.75 mm or about 2.85 mm. The filament is preferably made by extruding the polymer composition.

According to some embodiments, the polymer composition is in the form of microparticles or a powder or a powder mixture, for example having an average diameter, also called $d_{50}$, ranging from 1 to 200 μm, preferably from 10 to 100 μm, preferably from 20 to 80 μm as measured by electron microscopy or laser scattering. Preferably, the microparticles, powder or powdered material are suitable for use in additive manufacturing methods as described above, such as SLS.

Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

The method of the invention may comprise a step of depositing successive layers of the powder and a step of selectively sintering each layer prior to deposition of the subsequent layer. According to an embodiment, the step of printing layers comprises selective sintering by means of a high power energy source, for example a high power laser source such as an electromagnetic beam source.

According to the present invention, the powder may be heated before the sintering step to a temperature Tp (° C.), close to the melting point (Tm) of the PEEK-PEmEK copolymer. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

The 3D object/article/part may be built on substrate, for example a horizontal substrate and/or on a planar substrate. The substrate may be moveable in all directions, for example in the horizontal or vertical direction. During the 3D printing process, the substrate can, for example, be lowered, in order for the successive layer of unsintered polymeric material to be sintered on top of the former layer of sintered polymeric material.

According to an embodiment, the process further comprises a step consisting in producing a support structure. According to this embodiment, the 3D object/article/part is built upon the support structure and both the support structure and the 3D object/article/part are produced using the same AM method. The support structure may be useful in multiple situations. For example, the support structure may be useful in providing sufficient support to the printed or under-printing, 3D object/article/part, in order to avoid distortion of the shape 3D object/article/part, especially when this 3D object/article/part is not planar. This is particularly true when the temperature used to maintain the printed or under-printing, 3D object/article/part is below the re-solidification temperature of the powder.

The method of manufacture usually takes place using a printer. The SLS printer may comprise a sintering chamber and a powder bed, both maintained at determined at specific temperatures.

FFF 3D printers are, for example, commercially available from Apium, from Roboze, from Hyrel or from Stratasys, Inc. (under the trade name Fortus®). SLS 3D printers are, for example, available from EOS Corporation under the trade name EOSINT® P. FRTP 3D printers are, for example, available from Markforged.

PAM 3D printers are, for example, commercially available from Pollen. BAAM (Big Area Additive Manufacturing) is an industrial sized, additive machine commercially available from Cincinnati Inc.

SLS 3D printers are, for example, available from EOS Corporation under the trade name EOSINT® P.

Powder for Selective Laser Sintering ("SLS")

In some embodiments, the polymer composition is in the form of a powder or powder mixtures. According to this embodiment, it may further comprise a flow agent (F). This flow agent (F) may for example be hydrophilic. Examples of hydrophilic flow aids are inorganic pigments notably selected from the group consisting of silicas, aluminas and titanium oxide. Mention can be made of fumed silica.

Fumed silicas are commercially available under the trade name Aerosil® (Evonik) and Cab-O-Sil® (Cabot).

In some embodiments, the powder comprises from 0.01 to 10 wt. % of a flow agent (F), for example from 0.05 to 8 wt. %, from 0.1 to 6 wt. % or from 0.15 to 5 wt. % of at least one flow agent (F), for example of at least fumed silica.

These silicas are composed of nanometric primary particles (typically between 5 and 50 nm for fumed silicas). These primary particles are combined to form aggregates. In use as flow agent, silicas are found in various forms (elementary particles and aggregates).

According to one embodiment, the powder used in the method of the present invention comprises:
  at least 50 wt. % of the copolymer described above,
  from 0.01 wt. % to 10 wt. %, from 0.05 wt. % to 8 wt. %, from 0.1 to 6 wt. % or from 0.15 to 5 wt. % of at least one flow agent (F), and
  optionally at least one additive (A), for example selected from the group consisting of fillers (such as milled carbon fibers, silica beads, talc, calcium carbonates) colorants, dyes, pigments, lubricants, plasticizers, flame retardants (such as halogen and halogen free flame retardants), nucleating agents, heat stabilizers, light stabilizers, antioxidants, processing aids, fusing agents and electomagnetic absorbers,
  based on the total weight of the powder.

In some embodiments, the powder used in the method of the present invention comprises at least 60 wt. % of the copolymer, for example at least 70 wt. %, at least 80 wt. %, at least 90 wt. %, at least 95 wt. %, at least 98 wt. % or at least 99 wt. % of the copolymer described herein.

According to another embodiment, the powder in the method of the present invention consists essentially in the copolymer described herein.

Exemplary embodiments will now be described in the following non-limiting examples.

EXAMPLES

Materials

KetaSpire® PEEK KT-880P and KT-820P are PEEK polymers available from Solvay Specialty Polymers USA, LLC.

Cypek® PEKK DS-E is an amorphous poly(ether ketone ketone) (PEKK) available from Solvay Specialty Polymers USA.

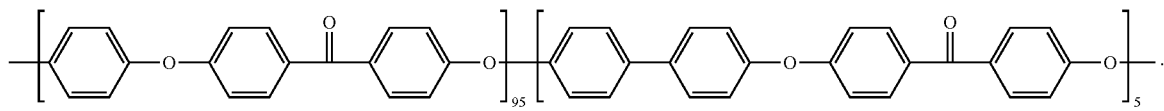

Hydroquinone, photo grade, available from Eastman, USA. It contained 0.38 wt. % moisture. This information was used to adapt the charge weights. All weights indicated include moisture.

Resorcinol, ACS reagent grade, available from Aldrich, USA.

4,4'-Biphenol, polymer grade is available from SI, USA.

4,4'-Difluorobenzophenone, polymer grade, is available from Jintan, China.

Diphenyl sulfone (polymer grade), available from Proviron (99.8% pure).

Sodium carbonate, light soda ash, available from Solvay S. A., France, dried at 120° C./100 Torr for 12 h.

Potassium carbonate with a d90<45 μm, available from Armand products, dried at 120° C./100 Torr for 12 h.

Lithium chloride (anhydrous grade), available from Acros.

Preparation of Polymer Compositions of Examples and Comparative Examples

Comparative Example 1

Comparative Example 1 was KetaSpire® PEEK KT-820P.

Comparative Example 2: Preparation of 95/5 PEEK-PEDEK Copolymer

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 121.86 g of diphenyl sulfone (DPS), 25.707 g of hydroquinone, 2.281 g of 4,4'-biphenol (BP) and 54.261 g of 4,4'-difluorobenzophenone (4,4'-DFBP). The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.8764 g of $Na_2CO_3$ and 0.1693 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone (4,4'-DFBP) were added to the reaction mixture while keeping a nitrogen purge on the reactor. After 5 minutes, 0.418 g of lithium chloride (LiCl) were added to the reaction mixture. 10 minutes later, another 2.138 g of 4,4'-difluorobenzophenone (4,4'-DFBP) were added to the reactor and the reaction mixture was kept at temperature for 15 minutes.

The reactor content was then poured from the reactor into a SS pan and cooled. The solid was broken up and ground in an attrition mill through a 2 mm screen. DPS and salts were extracted from the mixture with acetone and water at pH between 1 and 12. The powder was then removed from the reactor and dried at 120° C. under vacuum for 12 hours yielding 65 g of a white powder.

The repeat unit of the polymer is:

Comparative Examples 3-10: Preparation of Various PEEK-PEDEK Copolymers

The same procedure as Comparative Example 2 was followed except using the following amounts of reagents (Tables 1 and 2):

TABLE 1

| PEEK-PEDEK | CE3 90/10 | CE4 85/15 | CE5 80/20 | CE6 75/25 |
|---|---|---|---|---|
| DPS (g) | 123.45 | 127.70 | 127.70 | 128.21 |
| Hydroquinone (g) | 24.354 | 23.508 | 21.861 | 20.295 |
| BP (g) | 4.562 | 6.993 | 9.207 | 11.405 |
| 4,4'-DFBP (g) | 54.261 | 55.531 | 54.835 | 54.368 |
| $Na_2CO_3$ (g) | 26.876 | 27.530 | 27.339 | 26.876 |
| $K_2CO_3$ (g) | 0.169 | 0.173 | 0.171 | 0.169 |
| $1^{st}$ step termination 4,4'-DFBP (g) | 6.415 | 3.822 | 6.577 | 6.415 |
| $2^{nd}$ step termination LiCl (g) | 0.418 | 1.061 | 1.285 | 0.418 |
| $3^{rd}$ step termination 4,4'-DFBP (g) | 2.138 | 2.184 | 2.192 | 2.138 |

TABLE 2

| PEEK-PEDEK | CE7 70/30 | CE8 60/40 | CE9 50/50 | CE10 40/60 |
|---|---|---|---|---|
| DPS (g) | 129.80 | 287.65 | 288.96 | 145.87 |
| Hydroquinone (g) | 18.942 | 35.123 | 28.718 | 9.940 |
| BP (g) | 13.686 | 39.477 | 48.415 | 25.138 |
| 4,4'-DFBP (g) | 54.368 | 116.455 | 114.258 | 49.831 |
| $Na_2CO_3$ (g) | 26.876 | 58.141 | 57.044 | 24.682 |
| $K_2CO_3$ (g) | 0.1524 | 0.366 | 0.359 | 0.1555 |
| $1^{st}$ step termination 4,4'-DFBP (g) | 6.415 | 13.878 | 13.616 | 5.892 |
| $2^{nd}$ step termination LiCl (g) | 0.418 | 0.904 | 0.887 | 0.384 |
| $3^{rd}$ step termination 4,4'-DFBP (g) | 2.138 | 4.626 | 4.539 | 1.964 |

Comparative Example 11

Comparative Example 11 was Cypek® PEKK DS-E.

Inventive Example 12: Preparation of 95/5 PEEK-PEmEK Copolymer

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.62 g of diphenyl sulfone, 27.491 g of hydroquinone, 1.443 g of resorcinol and 57.854 g of 4,4'-difluorobenzophenone. The flask content was evacuated under vacuum and then filled with high purity nitrogen (containing less than 10 ppm O2). The reaction mixture was then placed under a constant nitrogen purge (60 mL/min).

The reaction mixture was heated slowly to 150° C. At 150° C., a mixture of 28.741 g of $Na_2CO_3$ and 0.181 g of $K_2CO_3$ was added via a powder dispenser to the reaction mixture over 30 minutes. At the end of the addition, the reaction mixture was heated to 320° C. at 1° C./minute. After 13 minutes at 320° C., 6.860 g of 4,4'-difluorobenzophenone were added to the reaction mixture while keeping a nitrogen purge on the reactor. After 5 minutes, 0.447 g of lithium chloride were added to the reaction mixture. 10 minutes later, another 2.287 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 100° C. under vacuum for 12 hours yielding 70 g of a light brown powder.

The repeat unit of the polymer is:

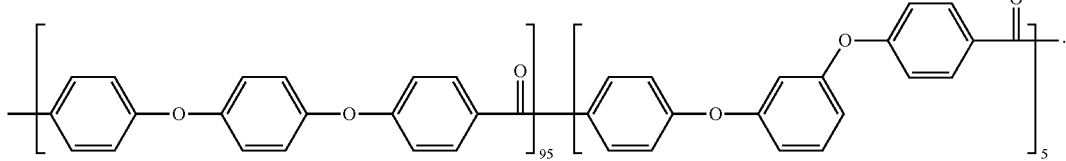

The melt viscosity measured by capillary rheolology at 410° C., 46 $s^{-1}$ was 1.12 $kN·s/m^2$.

Inventive Examples 13-17 and Comparative Example 18: Preparation of Various PEEK-PEmEK Copolymers The same procedure as Example 12 was followed except using the following amounts of reagents (table 3):

TABLE 3

| PEEK-PEmEK | E13 90/10 | E14 80/20 | E15 70/30 | E16 60/40 | E17 50/50 | CE18 40/60 |
|---|---|---|---|---|---|---|
| DPS (g) | 128.62 | 396.9 | 396.9 | 396.9 | 128.62 | 128.62 |
| Hydroquinone (g) | 26.044 | 52.133 | 45.616 | 39.099 | 14.469 | 11.575 |
| Resorcinol (g) | 2.885 | 12.995 | 19.493 | 25.990 | 14.427 | 17.312 |
| 4,4'-DFBP (g) | 57.854 | 132.08 | 132.08 | 132.08 | 58.655 | 58.655 |
| $Na_2CO_3$ (g) | 28.741 | 64.723 | 64.723 | 64.723 | 28.741 | 28.741 |
| $K_2CO_3$ (g) | 0.181 | 0.408 | 0.408 | 0.408 | 0.181 | 0.181 |
| $1^{st}$ step termination 4,4'-DFBP (g) | 6.860 | 15.449 | 15.449 | 15.449 | 6.860 | 13.720 |
| $2^{nd}$ step termination LiCl (g) | 0.447 | 1.006 | 1.006 | 1.006 | 0.447 | 0.447 |
| $3^{rd}$ step termination 4,4'-DFBP (g) | 2.287 | 5.150 | 5.150 | 5.150 | 2.287 | 2.287 |
| Melt viscosity ($kN·s/m^2$) | 0.70 | 2.36 | 2.92 | 2.24 | 2.57 | 13.6 |

Analytical Methods

Determination of Melting Temperature (Tm)

The melting temperature (Tm) was determined as the peak temperature of the melting endotherm on the second heat scan in a differential scanning calorimeter (DSC) according to ASTM D3418-03 and E794-06 and using heating and cooling rates of 20° C./min.

A TA Instruments DSC Q20 was used with nitrogen as carrier gas (99.998% purity, 50 mL/min). Temperature and heat flow calibrations were performed using indium. Sample size was 5 to 7 mg. The weight was recorded ±0.01 mg. The heat cycles were:

1st heat cycle: 30.00° C. to 400.00° C. at 20.00° C./min, isothermal at 400.00° C. for 1 min;
1st cool cycle: 400.00° C. to 30.00° C. at 20.00° C./min, isothermal for 1 min;
2nd heat cycle: 30.00° C. to 400.00° C. at 20.00° C./min, isothermal at 400.00° C. for 1 min.

The melting temperature (Tm) was determined as the peak temperature of the melting endotherm on the second heat scan. The melting of the composition was taken as the area over a linear baseline drawn from 160° C. to a temperature above the last endotherm.

Determination of Glass Transition Temperature (Tg)

The glass transition temperature (Tg) was measured in a differential scanning calorimeter (DSC) according to ASTM D3418-03 and E1356-03, and was recorded from the second heat up using the half height method.

Determination of Heat of Fusion (ΔH)

The heat of fusion (ΔH) of polymer powder was determined as the area under the melting endotherm on the second heat scan in a differential scanning calorimeter (DSC) according to ASTM D3418-03 and E793-06, and using heating and cooling rates of 20° C./min. The heat of fusion (ΔH) is determined on the second heat scan and is taken as the area over a linear baseline drawn from above the glass transition temperature (Tg) to a temperature above end of the endotherm.

Determination of the Melt Viscosity

The melt viscosity was measured using a capillary rheometer pursuant to ASTM D3835 standard. Readings were taken after 10 minute dwell time at 410° C. and a shear rate of 46.3 $s^{-1}$ using a tungsten-carbide die with the following characteristics: diameter=1.016 mm, length=20.32 mm, cone angle =120°

Thermal Properties of Polymer Powders

The thermal properties observed for the polymer powders of the Examples and Comparative Examples are shown in Table 4 below.

TABLE 4

| Example | Polymer | Tg (° C.) | Tc (° C.) | Tm (° C.) | ΔH fusion (J/g) (Powder) | ΔH fusion calculated (J/g) |
|---|---|---|---|---|---|---|
| CE1 | PEEK-KT-820 | 149 | 287 | 339 | 49 | 58 |
| CE2 | PEEK-PEDEK (95/5) | 150 | 288 | 335 | 56 | 55 |

TABLE 4-continued

| Example | Polymer | Tg (° C.) | Tc (° C.) | Tm (° C.) | ΔH fusion (J/g) (Powder) | ΔH fusion calculated (J/g) |
|---|---|---|---|---|---|---|
| CE3 | PEEK-PEDEK (90/10) | 150 | 279 | 327 | 48 | 50 |
| CE4 | PEEK-PEDEK (85/15) | 151 | 261 | 320 | 47 | 45 |
| CE5 | PEEK-PEDEK (80/20) | 153 | 256 | 313 | 40 | 40 |
| CE6 | PEEK-PEDEK (75/25) | 153 | 242 | 305 | 30 | 35 |
| CE7 | PEEK-PEDEK (70/30) | 153 | 233 | 296 | 23 | 28 |
| CE8 | PEEK-PEDEK (60/40) | 157 | 232 | 317 | 28 | 43 |
| CE9 | PEEK-PEDEK (50/50) | 159 | 284 | 349 | 38 | 65 |
| CE10 | PEEK-PEDEK (40/60) | 159 | 322 | 371 | 50 | 79 |
| CE11 | PEKK DS-E | 155 | ND* | ND | ND | — |
| 12 | PEEK-PEmEK (95/5) | 154 | 290 | 333 | 60 | 54 |
| 13 | PEEK-PEmEK (90/10) | 146 | 252 | 325 | 54 | 48 |
| 14 | PEEK-PEmEK (80/20) | 143 | 249 | 307 | 47 | 36 |
| 15 | PEEK-PEmEK (70/30) | 140 | 199 | 288 | 36 | 23 |
| 16 | PEEK-PEmEK (60/40) | 134 | 174 | 266 | 10 | 6 |
| 17 | PEEK-PEmEK (50/50) | 129 | ND | 253 | 3 | −3 |
| CE18 | PEEK-PEmEK (40/60) | 131 | ND | ND | ND | — |

*ND = Not detected.
The composition was amorphous.

Table 4 includes melting point (Tm) and heat of fusion ΔH data for a variety of comparative PEEK-PEDEK copolymers and inventive PEEK-PEmEK copolymers over a range of PEEK/PEDEK and PEEK/PEmEK mole ratios. This heat of fusion (ΔH) and melting point (Tm) data is presented graphically in FIG. 1.

As shown in FIG. 1, as the relative amount of PEDEK repeat units in the PEEK-PEDEK copolymers of Comparative Examples 2 to 10 increased, the heat of fusion (ΔH) and melting temperatures (Tm) generally decreased from a high of ΔH=56 J/g and Tm=335° C. (Comparative Example 2, PEEK-PEDEK (95/5)) to a low of ΔH=23 J/g and Tm=296° C. (Comparative Example 7, PEEK-PEDEK (70/30)); however, from Comparative Examples 8 (PEEK-PEDEK (60/40)) to 10 (PEEK-PEDEK (40/60)), the trend reversed, and both heat of fusion (ΔH) and melting temperatures (Tm) increased.

In surprisingly contrast, as the relative amount of $R_{PEmEK}$ repeat units was increased over Examples 12 to 17, the inventive PEEK-PEmEK copolymers exhibited a much different behaviour. First, the PEEK-PEmEK copolymers achieved a higher heat of fusion (ΔH) for a given melting temperature (Tm) over the range 333° C. to 296° C. than did the comparative PEEK-PEDEK copolymers, and second, the PEEK-PEmEK copolymers unexpectedly achieved melting temperatures (Tm) as low as 43° C. lower than the lowest melting temperature (Tm) observed for the comparative PEEK-PEDEK copolymers. In other words, in contrast to the comparative examples, the PEEK-PEmEK copolymers of the invention were unexpectedly found to satisfy the inequality, $\Delta H \geq -0.0005(Tm)^2 + 1.008(Tm) - 226.33$, the boarder of which is represented by the curve $\Delta H = -0.0005(Tm)^2 + 1.008(Tm) - 226.33$ shown in FIG. 1.

Notably, the (60/40) PEEK-PEmEK copolymer of Comparative Example CE18 is not shown in FIG. 1 because it was amorphous and therefore did not have a heat of fusion (ΔH).

In addition, Examples 12 and 13 surprisingly exhibited melting temperatures (Tm) less than that of PEEK (Comparative Example 1) with heats of fusion as much as 28% greater than that observed for PEEK.

Should the disclosure of any patents, patent applications, and publications which are incorporated herein by reference conflict with the description of the present application to the extent that it may render a term unclear, the present description shall take precedence.

The invention claimed is:

1. A method of making a shaped article comprising printing layers of a polymer composition comprising at least one PEEK-PEmEK copolymer comprising at least 50 mol %, collectively, of repeat units ($R_{PEEK}$) and repeat units ($R_{PEmEK}$), relative to the total number of repeat units in the PEEK-PEmEK copolymer, wherein:

(a) repeat units ($R_{PEEK}$) are repeat units of formula:

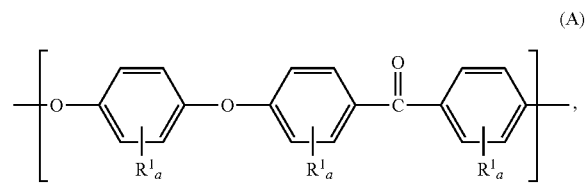

(A)

and (b) repeat units ($R_{PEmEK}$) are repeat units of formula (B):

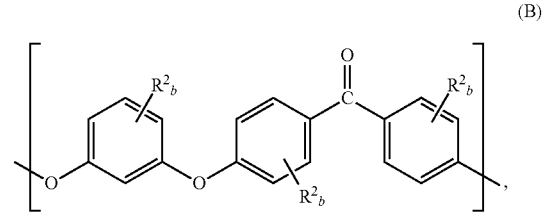

(B)

wherein:
each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
each a and b is independently selected from the group consisting of integers ranging from 0 to 4, and
the PEEK-PEmEK copolymer includes the repeat units $R_{PEEK}$ and $R_{PEmEK}$ in a molar ratio $R_{PEEK}/R_{PEmEK}$ ranging from 95/5 to 45/55.

2. The method of claim 1, wherein the repeat units ($R_{PEEK}$) are repeat units of formula:

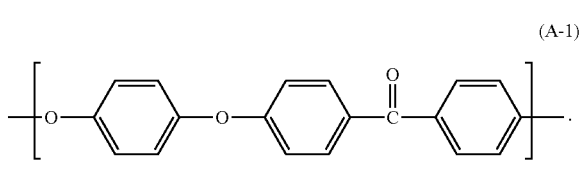

(A-1)

3. The method of claim 2, wherein the repeat units ($R_{PEmEK}$) are repeat units of formula:

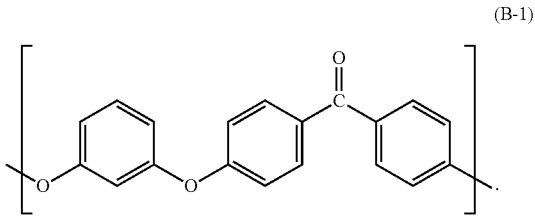

(B-1)

4. The method of claim 1, wherein the PEEK-PEmEK copolymer exhibits a heat of fusion (ΔH) ranging from 1 J/g to 65 J/g, wherein the heat of fusion (ΔH) is determined as the area under the melting endotherm on the second heat scan in a differential scanning calorimeter (DSC) according to ASTM D3418-03 and E793-06, and using heating and cooling rates of 20° C/min.

5. The method of claim 4, wherein the PEEK-PEmEK copolymer meets the following inequality:

$$\Delta H \geq -0.0005(Tm)^2 + 1.008(Tm) - 226.33$$

wherein:
ΔH is the heat of fusion of PEEK-PEmEK copolymer in J/g, and Tm is the melting temperature of the PEEK-PEmEK copolymer in ° C. measured as the peak temperature of the melting endotherm on the second heat scan in a differential scanning calorimeter (DSC) according to ASTM D3418-03 and E794-06 and using heating and cooling rates of 20° C/min.

6. The method of claim 1, wherein the polymer composition comprises at least one of a reinforcing filler, an additive, or a combination thereof.

7. The method of claim 1, wherein the composition comprises at least 10 wt. % of PEEK-PEmEK copolymer, based on the total weight of the polymer composition.

8. The method of claim 1, wherein the polymer composition comprises the at least one reinforcing filler selected from the group consisting of a glass fiber, a carbon fiber, and a combination thereof.

9. The method of claim 1, by an extrusion-based additive manufacturing system, a powder-based additive manufacturing system or a continuous Fiber-Reinforced Thermosplastic (FRTP) printing method.

10. A shaped article obtained by the method of claim 1.

11. A filament for making a shaped article by printing layers of the article, the filament being made of a polymer composition comprising at least one PEEK-PEmEK copolymer comprising at least 50 mol. %, collectively, of repeat units ($R_{PEEK}$) and repeat units ($R_{PEmEK}$), relative to the total number of repeat units in the PEEK-PEmEK copolymer, wherein:

(a) repeat units ($R_{PEEK}$) are repeat units of formula:

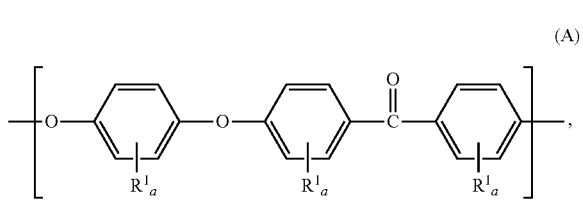

and (b) repeat units ($R_{PEmEK}$) are repeat units of formula (B):

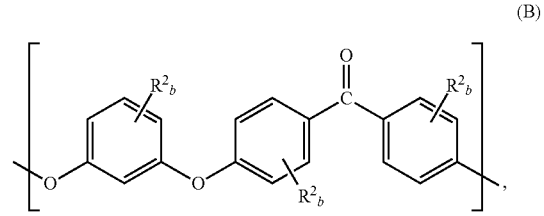

wherein:
each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, each a and b is independently selected from the group consisting of integers ranging from 0 to 4, and the PEEK-PEmEK copolymer includes the repeat units $R_{PEEK}$ and $R_{PEmEK}$ in a molar ratio $R_{PEEK}/R_{PEmEK}$ ranging from 95/5 to 45/55.

12. The filament of claim 11, having a cylindrical geometry and a diameter ranging from 0.5 to 5 mm.

13. A powder for making a shaped article by printing layers of the article, the powder being made of a polymer composition comprising at least one PEEK-PEmEK copolymer comprising at least 50 mol. %, collectively, of repeat units ($R_{PEEK}$) and repeat units ($R_{PEmEK}$), relative to the total number of repeat units in the PEEK-PEmEK copolymer, wherein:

(a) repeat units ($R_{PEEK}$) are repeat units of formula:

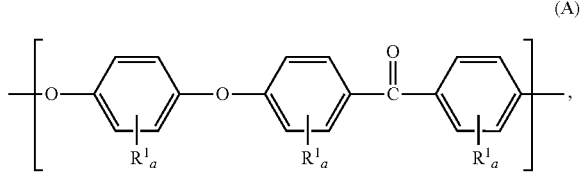

and
(b) repeat units ($R_{PEmEK}$) are repeat units of formula (B):

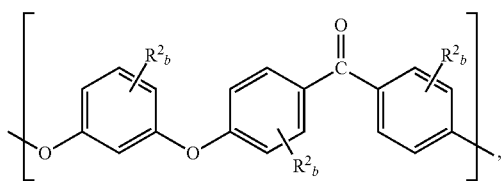

wherein:
each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
each a and b is independently selected from the group consisting of integers ranging from 0 to 4, and
the PEEK-PEmEK copolymer includes the repeat units $R_{PEEK}$ and $R_{PEmEK}$ in a molar ratio $R_{PEEK}/R_{PEmEK}$ ranging from 95/5 to 45/55.

14. The powder of claim 13, having an average diameter ($d_{50}$) ranging from 1 to 200 μm, as measured by electron microscopy or laser scattering.

15. A process for the manufacture of a shaped article by printing layers of the article using the filaments of claim 11 in a 3D printer.

16. A process for the manufacture of a shaped article by printing layers of the article using the powder of claim 13 in a 3D printer.

17. The method of claim 3, wherein the PEEK-PEmEK copolymer comprises at least 95 mol %, collectively, of the repeat units ($R_{PEEK}$) and the repeat units ($R_{PEmEK}$), relative to the total number of repeat units in the PEEK-PEmEK copolymer.

18. The method of claim 3, wherein the PEEK-PEmEK copolymer comprises at least 99 mol %, collectively, of the repeat units ($R_{PEEK}$) and the repeat units ($R_{PEmEK}$), relative to the total number of repeat units in the PEEK-PEmEK copolymer.

19. The filament of claim 11, wherein the PEEK-PEmEK copolymer comprises at least 95 mol %, collectively, of the repeat units ($R_{PEEK}$) and the repeat units ($R_{PEmEK}$), relative to the total number of repeat units in the PEEK-PEmEK copolymer.

20. The powder of claim 13, wherein the PEEK-PEmEK copolymer comprises at least 95 mol %, collectively, of the repeat units ($R_{PEEK}$) and the repeat units ($R_{PEmEK}$), relative to the total number of repeat units in the PEEK-PEmEK copolymer.

* * * * *